US012633662B2

(12) United States Patent
Gungor

(10) Patent No.: US 12,633,662 B2
(45) Date of Patent: May 19, 2026

(54) COMPACT BEAMFORMING MODULE FOR PHASED ARRAY ANTENNA SYSTEMS

(71) Applicant: SPRA SAVUNMA HAVACILIK VE UZAY TEKNOLOJILERI ELEKTRONIK YAZILIM MAKINA SANAYI VETICARET LIMITED SIRKETI, Golbasi (TR)

(72) Inventor: Cagatay Erturk Gungor, Cankaya (TR)

( * ) Notice: Subject to any disclaimer, the term of this patent is extended or adjusted under 35 U.S.C. 154(b) by 349 days.

(21) Appl. No.: 18/533,147

(22) PCT Filed: Jun. 7, 2022

(86) PCT No.: PCT/TR2022/050545
§ 371 (c)(1),
(2) Date: Dec. 7, 2023

(87) PCT Pub. No.: WO2022/260637
PCT Pub. Date: Dec. 15, 2022

(65) Prior Publication Data

US 2025/0105505 A1 Mar. 27, 2025

(30) Foreign Application Priority Data

Jun. 8, 2021 (TR) ................................ 2021/009415

(51) Int. Cl.
*H01P 1/18* (2006.01)
*H01Q 3/40* (2006.01)

(52) U.S. Cl.
CPC ............... *H01Q 3/40* (2013.01); *H01P 1/184* (2013.01)

(58) Field of Classification Search
CPC .. H01P 1/184; H01P 1/18; H01P 1/127; H01P 1/185; H01P 1/15; H01P 3/003; H01P 5/04; H01P 1/2039; H01P 1/203; H01P 1/10; H01P 11/00; H01P 5/188; H01P 1/20; H01P 1/227; H01P 1/38; H01P 3/026; H01P 3/08; H01P 5/16; H01P 1/12; H01P 1/181; H01P 1/182; H01P 1/20381; H01P 5/10; H01P 1/36; H01P 5/184; H01P 7/082; H01P 7/088; H01P 1/165; H01P 1/2005; H01P 1/2135; H01P 5/222;

(Continued)

(56) References Cited

U.S. PATENT DOCUMENTS 4,254,385 A * 3/1981 Childs ....................... H01P 1/15 333/116
4,859,972 A * 8/1989 Franke .................... H01P 1/185 333/164

(Continued)

*Primary Examiner* — John W Poos
(74) *Attorney, Agent, or Firm* — Recipon Consulting, LLC; Shirley A. Recipon

(57) ABSTRACT

The present invention relates to a compact beamforming module (10) for phased array antennas, comprising RF switches (12) and a plurality of phase shifters (20), each of which has at least one defected ground structure (26/27/18), by applying a thin film structure on any type of substrate (22). The beamforming module of the invention provides unique synergistic features and advantages, such as material selection independent of the substrate (22) type, ease of integration with semiconductor circuits, usability with high-power amplifiers to provide high EIRP antennas, and high space savings with cost-effectiveness.

20 Claims, 5 Drawing Sheets

(58) Field of Classification Search

CPC ...... H01P 1/20372; H01P 1/208; H01P 1/213; H01P 1/387; H01P 11/005; H01P 3/06; H01P 5/18; H01P 5/19; H01P 7/10; H01P 1/005; H01P 1/2053; H01P 1/22; H01P 1/397; H01P 5/103; H01P 5/107; H01P 9/006; H01P 1/061; H01P 1/064; H01P 1/20345; H01P 1/207; H01P 11/007; H01P 3/02; H01P 5/00; H01P 5/12; H01P 7/00; H01P 7/065; H01Q 21/28; H01Q 1/243; H01Q 3/46; H01Q 1/50; H01Q 1/38; H01Q 13/103; H01Q 3/36; H01Q 1/521; H01Q 1/246; H01Q 3/24; H01Q 5/371; H01Q 9/145; H01Q 15/0086; H01Q 9/16; H01Q 9/30; H01Q 3/44; H01Q 3/34; H01Q 9/42; H01Q 21/0012; H01Q 21/20; H01Q 9/0442; H01Q 23/00; H01Q 3/26; H01Q 3/28; H01Q 21/065; H01Q 21/29; H01Q 21/0006; H01Q 9/285; H01Q 1/44; H01Q 21/00; H01Q 1/36; H01Q 13/10; H01Q 5/40; H01Q 1/2291; H01Q 15/0066; H01Q 5/00; H01Q 1/523; H01Q 21/064; H01Q 1/04; H01Q 9/04; H01Q 9/40; H01Q 9/28; H01Q 1/2283; H01Q 13/20; H01Q 1/24; H01Q 21/205; H01Q 3/2617; H01Q 1/525; H01Q 21/30; H01Q 3/20; H01Q 5/314; H01Q 15/002; H01Q 19/09; H01Q 21/12; H01Q 5/22; H01Q 5/48; H01Q 5/307; H01Q 7/00; H01Q 1/48; H01Q 25/00; H01Q 3/267; H01Q 1/2216; H01Q 13/08; H01Q 3/2605; H01Q 5/15; H01Q 15/008; H01Q 5/335; H01Q 5/50; H01Q 13/206; H01Q 21/0018; H01Q 5/321; H01Q 9/14; H01Q 25/002; H01Q 3/01; H01Q 1/28; H01Q 1/32; H01Q 21/061; H01Q 3/38; H01Q 1/242; H01Q 21/08; H01Q 3/30; H01Q 9/0407; H01Q 13/18; H01Q 21/24; H01Q 3/2694; H01Q 3/40; H01Q 21/0087; H01Q 3/2682; H01Q 1/3233; H01Q 13/28; H01Q 15/0006; H01Q 5/42; H01Q 1/1292; H01Q 1/22; H01Q 1/2225; H01Q 1/286; H01Q 15/0033; H01Q 21/005; H01Q 1/34; H01Q 21/26; H01Q 3/00; H01Q 5/328; H01Q 21/22; H01Q 5/385; H01Q 21/0025; H01Q 21/0075; H01Q 21/0093; H01Q 21/293; H01Q 3/443; H01Q 5/35; H01Q 5/357; H01Q 21/0031; H01Q 5/10; H01Q 9/0421; H01Q 1/241; H01Q 1/364; H01Q 1/42; H01Q 11/02; H01Q 21/0056; H01Q 9/045; H01Q 15/148; H01Q 19/10; H01Q 21/062; H01Q 3/08; H01Q 3/247; H01Q 3/446; H01Q 5/364; H01Q 5/378; H01Q 5/392; H01Q 1/2266; H01Q 13/085; H01Q 15/24; H01Q 19/062; H01Q 3/42; H01Q 9/20; H01Q 1/125; H01Q 13/22; H01Q 15/006; H01Q 15/14; H01Q 21/245; H01Q 25/008; H01Q 1/245; H01Q 13/06; H01Q 15/147; H01Q 19/06; H01Q 25/04; H01Q 3/385; H01Q 7/005; H01Q 1/2208; H01Q 19/067; H01Q 25/005; H01Q 3/14; H01Q 3/22; H01Q 5/45; H01Q 1/288; H01Q 1/3283; H01Q 13/106; H01Q 19/32; H01Q 9/0414; H01Q 9/0457; H01Q 1/3241; H01Q 1/52; H01Q 13/24; H01Q 15/0026; H01Q 15/02; H01Q 15/10; H01Q 15/23; H01Q 19/005; H01Q 21/0043; H01Q 21/0068; H01Q 25/001; H01Q 25/007; H01Q 3/2658; H01Q 9/26; H01Q 9/32; H01Q 9/44; H01Q 1/02; H01Q 1/06; H01Q 1/2258; H01Q 1/2275; H01Q 1/3291; H01Q 11/12; H01Q 13/00; H01Q 15/16; H01Q 19/175; H01Q 21/068; H01Q 3/245; H01Q 3/2676; H01Q 3/32; H01Q 1/005; H01Q 1/08; H01Q 1/12; H01Q 1/1264; H01Q 1/20; H01Q 1/248; H01Q 1/3275; H01Q 1/362; H01Q 1/528; H01Q 11/14; H01Q 13/26; H01Q 15/004; H01Q 19/104; H01Q 19/12; H01Q 19/13; H01Q 19/30; H01Q 21/10; H01Q 3/242; H01Q 3/2611; H01Q 3/2623; H01Q 9/0428; H01Q 9/0464; H03F 2200/451; H03F 3/195; H03F 3/19; H03F 2200/294; H03F 3/245; H03F 3/21; H03F 1/565; H03F 2200/222; H03F 2200/387; H03F 1/0205; H03F 3/211; H03F 1/56; H03F 2203/21157; H03F 3/24; H03F 3/193; H03F 2200/391; H03F 1/223; H03F 3/2176; H03F 3/72; H03F 1/3241; H03F 3/191; H03F 3/213; H03F 2200/372; H03F 2200/111; H03F 1/22; H03F 3/2171; H03F 3/68; H03F 1/32; H03F 2200/336; H03F 3/60; H03F 3/2178; H03F 1/34; H03F 2200/301; H03F 2200/351; H03F 3/217; H03F 2200/331; H03F 1/0222; H03F 2200/102; H03F 1/3247; H03F 2203/7209; H03F 1/08; H03F 2200/429; H03F 1/26; H03F 1/0227; H03F 1/0261; H03F 2200/108; H03F 2200/378; H03F 3/45179; H03F 1/0277; H03F 1/0288; H03F 1/3294; H03F 2200/225; H03F 2200/366; H03F 2200/543; H03F 2200/78; H03F 2203/45256; H03F 3/4521; H03F 2200/267; H03F 2200/411; H03F 2200/27; H03F 2200/318; H03F 2200/61; H03F 1/0211; H03F 1/301; H03F 1/3276; H03F 1/3282; H03F 2200/546; H03F 3/601; H03F 1/3252; H03F 2200/414; H03F 2203/7221; H03F 3/602; H03F 1/0244; H03F 1/025; H03F 1/3205; H03F 2200/165; H03F 2200/555; H03F 2203/7236; H03F 1/02; H03F 1/523; H03F 2200/324; H03F 2200/432; H03F 2200/48; H03F 2200/504; H03F 2200/511; H03F 2200/75; H03F 2203/21109; H03F 2203/7215; H03F 3/189; H03F 3/2173; H03F 1/06; H03F 1/3258; H03F 1/38; H03F 2200/09; H03F 2200/105; H03F 2200/156; H03F 2200/159; H03F 2200/168; H03F 2200/192; H03F 2200/198; H03F 2200/228; H03F 2200/321; H03F 2200/393; H03F 2200/456; H03F 2200/495; H03F 2200/541; H03F 2200/81; H03F 2203/21139; H03F 2203/45631; H03F 2203/7212; H03F 3/04; H03F 3/187; H03F 3/347; H03F

3/45; H03F 3/604; H03F 1/0266; H03F 2200/399; H03F 2200/417; H03F 2200/421; H03F 2200/45; H03F 2200/492; H03F 2203/45634; H03F 3/387; H03F 3/45475; H03F 1/0283; H03F 1/3288; H03F 2200/171; H03F 2200/174; H03F 2200/468; H03F 2200/471; H03F 2200/481; H03F 2200/507; H03F 2201/3212; H03F 2201/3231; H03F 2203/21142; H03F 3/22; H03F 1/0294; H03F 1/303; H03F 1/305; H03F 1/3211; H03F 1/52; H03F 2200/144; H03F 2200/213; H03F 2200/306; H03F 2200/42; H03F 2200/423; H03F 2200/426; H03F 2200/435; H03F 2200/498; H03F 2200/537; H03F 2200/54; H03F 2201/3233; H03F 2203/21106; H03F 2203/21169; H03F 2203/45544; H03F 2203/45554; H03F 2203/45644; H03F 3/265; H03F 3/45085; H03F 3/45183; H03H 7/38; H03H 2210/025; H03H 7/0115; H03H 7/0153; H03H 7/0161; H03H 2007/013; H03H 11/1291; H03H 3/02; H03H 7/12; H03H 7/463; H03H 9/0547; H03H 9/205; H03H 2009/02204; H03H 9/542; H03H 9/02015; H03H 9/605; H03H 9/70; H03H 2210/026; H03H 7/1741; H03H 9/0004; H03H 9/02007; H03H 9/02031; H03H 9/175; H03H 9/48; H03H 9/52; H03H 9/54; H03H 9/547; H03H 9/584; H03H 9/585; H03H 9/587; H03H 9/588; H03H 9/589; H03H 9/60; H03H 9/6479; H03H 9/66; H03H 7/40; H03H 9/131; H03H 9/462; H03H 9/505; H03H 7/09; H03H 9/465; H03H 7/1775; H03H 9/02409; H03H 2009/02511; H03H 2009/02519; H03H 2009/02527; H03H 7/20; H03H 11/20; H03H 2007/386; H03H 7/18; H03H 19/004; H03H 11/28; H03H 3/0078; H03H 9/24; H03H 9/2452; H03H 9/467; H03H 7/185; H03H 7/0138; H03H 11/04; H03H 2210/012; H03H 7/255; H03H 11/16; H03H 2007/006; H03H 11/265; H03H 17/0009; H03H 17/0054; H03H 17/08; H03H 19/008; H03H 9/02102; H03H 9/525; H03H 9/6403; H03H 11/30; H03H 2210/036; H03H 7/42; H03H 7/46; H03H 11/02; H03H 11/24; H03H 11/48; H03H 11/481; H03H 17/0289; H03H 19/006; H03H 2001/0014; H03H 2210/015; H03H 2210/04; H03H 7/24; H03H 1/02; H03H 2001/0064; H03H 3/0072; H03H 3/0073; H03H 5/12; H03H 7/06; H03H 7/17; H03H 7/1766; H03H 7/48; H03H 7/52; H03H 9/13; H03H 9/14508; H03H 9/19; H03H 9/25; H03H 11/1208; H03H 11/245; H03H 11/46; H03H 19/002; H03H 2003/027; H03H 2011/0488; H03H 7/0123; H03H 7/175; H03H 7/19; H03H 7/383; H03H 7/465; H03H 9/17; H03H 9/2426; H03H 9/706; H03H 11/0422; H03H 11/12; H03H 11/1221; H03H 11/126; H03H 17/0286; H03H 17/0291; H03H 19/00; H03H 2003/022; H03H 2009/241; H03H 2210/01; H03H 3/04; H03H 7/1758; H03H 9/172; H03H 9/64; H03H 9/6423; H03H 2015/005; H03H 2210/033; H03H 2240/00; H03H 7/00; H03H 7/075; H03H 7/1783; H03H 9/02062; H03H 9/02275; H03H 9/10; H03H 9/1007; H03H 9/1014; H03H 9/15; H03H 9/171; H03H 9/2405; H03H 9/2463; H03H 9/586; H03H 9/6483; H03H 9/725; H03H 9/74; H03H 11/22; H03H 17/0045; H03H 2003/023; H03H 2007/008; H03H 2009/02165; H03H 2009/02188; H03H 2009/155; H03H 7/345; H03H 9/02023; H03H 9/02047; H03H 9/02055; H03H 9/02078; H03H 9/02244; H03H 9/02393; H03H 9/02551; H03H 9/02637; H03H 9/02866; H03H 9/0519; H03H 9/1021; H03H 9/132; H03H 9/14541; H03H 9/14544; H03H 9/14582; H03H 9/173; H03H 9/2436; H03H 9/2457; H03H 9/42; H03H 9/566; H03H 9/568; H03H 9/6489; H03H 9/727

See application file for complete search history.

(56) References Cited

U.S. PATENT DOCUMENTS

| | | | | | |
|---|---|---|---|---|---|
| 5,066,930 | A * | 11/1991 | Morse | H01P 1/185 | 333/164 |
| 5,708,397 | A * | 1/1998 | Furutani | H03B 5/1852 | 331/177 V |
| 2005/0270123 | A1* | 12/2005 | Chiang | H01P 1/185 | 333/164 |
| 2008/0030420 | A1* | 2/2008 | Lee | H01Q 3/46 | 343/853 |
| 2008/0150800 | A1* | 6/2008 | Tsuji | H01Q 3/30 | 342/368 |
| 2017/0187086 | A1* | 6/2017 | Koul | H01H 59/0009 | |

* cited by examiner

COMPACT BEAMFORMING MODULE FOR PHASED ARRAY ANTENNA SYSTEMS

TECHNICAL FIELD

The present invention relates to a beamforming module for smart antenna systems. In particular, the invention relates to a compact beamforming module for use in phased array antennas.

PRIOR ART

Beamforming structures are widely used in satellite, aircraft, electronic warfare, radar communications, and navigation applications and enable beam steering via the application of phase delays at the antenna array elements. In a phased-array system, beamsteering or beamforming is achieved electronically instead of mechanically by using a number of antenna elements in order to control the direction of signal transmission or reception. Electronic control with faster scan rates, structural dimensions, high switching speed, prevention of transmission loss and incoming interference or noise, costs, and need for mechanical maintenance are important factors to be taken into consideration for antenna systems.

Unlike adaptive antennas requiring more advanced signal processing to function, which are more complex and costly, switched-beam antennas are constructed only by an antenna array, a beamforming network, RF switch, and simple controller element. The beamforming network as one of the most important parts thereof can be classified into digital beamforming and RF beamforming, while RF beamforming is usually involved in lens-based and circuit-based multibeam networks.

The semiconductor phase shifters, one of the essential elements of RF beamforming, are reciprocal in nature, and may be classified as digital or analog, depending on whether the control element is used as an electronic switch or a continuously variable reactance. Examples of devices that can act as electronic switches are the P-I-N diode, GaAs FET, and Schottky diodes. For analog processing, the voltage-controlled varactor diode is used most commonly. Consequently, system preferences change according to goals, needs, feasibility and expectations.

U.S. Pat. No. 6,611,230B2 discloses a phased array antenna with a phase-shifting device connected to a plurality of antenna elements and including a substrate, and a plurality of phase shifters on the substrate. Each phase shifter comprises a ferromagnetic material or a ferroelectric material such as barium strontium titanate, where the phase shift is achieved by changing the dielectric constant of the material with the voltage applied to the selected thin or thick film material. There are also a number of teachings from the prior art about the applications of ferroelectric materials, such as use as a substrate, frequency selective surface or signal transmission medium, or making deposition or coating the entire antenna or the substrate with the said material.

U.S. Pat. No. 7,642,881B1 discloses a Vanadium oxide RF/microwave integrated switch suitable for use with phased array radar antenna. CN105789787B and CN205621827U, filed by the same applicant, are directed to alternative embodiments for a frequency and bandwidth adjustable broadband balanced band pass filter for differential signals.

Despite such conventional applications may contribute to the system performance to some extent with slight improvements in Q values and low power handling, their use remains limited due to the very low Q values of switched passive circuit parts thereof such as filter banks and LC tank circuits in semiconductor processes, including integrated circuits with passive elements such as CMOS or RFSOI.

The performance of a phase shifter is negatively affected by the existing transmission losses. Higher transmission loss in a serial switching circuit which should be used in conventional digital phase shifters where fixed phase shift values are selected by switching, is still among one of the pending problems needed to be solved.

Phased array antennas are complex embodiments, which rely on many factors such as frequency range, bandwidth, polarization, and effective radiated power (EIRP). Therefore, the selection of materials, fabrication and manufacturing process of such an antenna may be restricted by design characterizations of phase shifters, switches, and/or transmission lines based on certain materials and methods. As in some embodiments aimed for metamaterial antennas or certain thin-film substrates, the most suitable parameters for the signal distribution network may not always be suitable for the signal transmission network.

In the manufacture of beamforming modules, not only a cost-saving design is of primary concern but also physical size and power constraints should be effectively overcome. It is, therefore, required to include phase-shift circuits and related components such as diodes and switches in downsizing by design as much as possible, and to comply with the rules of distance between patches, together with the market standards of the components thereof, as the restricting factors. For instance, the area where the components can be placed decreases when the Ku and Ka band frequencies are aimed to be reached by the said antennas. Therefore, it is desired that said components such as the varactor diode and switch can be incorporated on the same substrate in the structure of a beamforming module.

Consequently, there exists a need today for reducing or even removing the restrictive conditions as much as possible for the said antenna design preferences, while achieving the aforesaid performance factors.

OBJECTS OF THE INVENTION

The main purpose of the present invention is to provide a beamforming module with less loss-higher energy efficiency, and higher power handling-higher power output, compared to conventional applications in phased array antenna systems.

Another important aim of the invention is to provide a beamforming module with high quality (Q) values for the construction of switches and transmission lines without any restrictive conditions for material structure or design and manufacturing method in view of phased array antenna design preferences.

Another object of the invention is to provide a compact-size and cost-effective antenna beamforming module for achieving higher physical size savings.

Yet another object of the invention is to provide a synergistic switching approach between passive circuits with different degrees of phase shift within the antenna beamforming modules.

BRIEF DESCRIPTION OF THE INVENTION

In order to achieve the said objects of the present invention, there is provided a compact beamforming module for phased array antennas, comprising at least one phase shifter with coupled lines arranged on a substrate and constructed on a defected ground structure, and RF switches.

A varactor is connected to each diagonally opposite end of the coupled lines of said phase shifter comprising coupled two transmission lines. Depending on the applied voltage, the capacitance of the varactor and thus the conduction phase of the coupled lines circuit can be changed to achieve the predetermined phase shift outcome. Preferably, said varactor structure is transferred to the thin film in order to further reduce the design size.

Odd/even mode impedances are adjusted appropriately thanks to the said defected ground structure and the coupled lines arranged thereon. The defected ground structure has the effect of increasing the even-mode impedance. Optimization is achieved by adjusting the characteristic impedance and length of the transmission lines connected to the coupled lines. Optionally, a capacitor with the effect of reducing the odd-mode impedance can be added between the coupled lines.

Said varactor consists of a thin film component grown on the surface. The thin film acts as a dielectric between the metal electrodes coated on the surface, and provides capacitance. The voltage-dependent capacitance is obtained by means of the dielectric constant of the ferroelectric material, which varies with voltage. The features preferred for the varactor selection are appropriate maximum/minimum capacitance ratio achievable depending on the applied voltage, low process sensitivity, and low nonlinearity as well as operability thereof at low voltages. According to the invention, the varactor preferably comprises a thin film component, preferably a ferroelectric material, in particular, Barium Strontium Titanate (BST) or Zinc Oxide (ZnO), grown on a sapphire or alumina ceramic.

The desired phase shift according to the invention is provided by the coupled lines on the defected ground structure on any hard substrate of high dielectric constant, such as aluminum, sapphire, GaAs, GaN, CMOS, and SiC·, without any limitation for the said substrate material, number or layer structures.

The beamforming module of the present invention has RF switches (switching circuits), each of which preferably comprises a vanadium dioxide ($VO_2$) component grown on sapphire, Si or $Al_2O_3$ surface. The switching function is carried out by using the thermochromic feature of the $VO_2$ thin-film circuit to transfer the RF signal to the desired line, while the other lines are terminated with high impedance. In this context, both reflective and absorptive switches can be used.

Each switching circuit is connected to more than one, preferably two, $VO_2$ thin-film lines connected to the common line. The $VO_2$ thin film has a high resistance insulator characteristic under a certain transition temperature, and a low resistance conductor characteristic above said temperature. The thin film temperature is increased by passing a current through the control lines connected to the switching circuits, thereby controlling the characteristic of the thin film.

The present invention also provides a manufacturing method for a compact beamforming module for phased array antennas comprising at least one phase shifter and RF switches arranged in at least one layer on at least one substrate. Conductive elements known well from the prior art are provided to define signal and transmission paths/lines on said substrate and said conductive elements are positioned on signal paths/lines. The method basically comprises the following steps;

arranging each phase shifter and RF switches on at least one defected ground structure, wherein said phase shifter comprises coupled lines formed from two coupled transmission lines, providing at least one varactor to be connected to each diagonally opposite end of the coupled lines in said phase shifter for causing a phase shift of a signal, wherein said varactor comprises a ferroelectric material, and said RF switch comprises a thin film layer of vanadium dioxide.

As all the basic components used in the construction of the beamforming module, in particular the component, connection, and material structures of the RF switch/switching circuit and the ferroelectric varactor, have been explained so far, they will not be repeated again. In the compact beamforming module, it is preferred to use a thin film process on said substrate, known well from the prior art.

Within the scope of the present invention, much higher Q value and power handling can be achieved at lower costs, thanks to the fact that the coupled lines, varactors, and switches are essentially realized together in a thin film on any substrate instead of processes such as CMOS, RFSOI. For instance, compared to the conventional semiconductor processes with a Q value of 10 and a power of 100 milliWatts, the said values are increased approximately 10 folds according to the invention. Thus, a synergistic switching approach is achieved between passive circuits in the beamforming modules that provide different degrees of phase shift.

The compact beamforming module of the invention can be combined directly on GaAs, GaN, FET, or MMIC type ICs since it can operate independently of the substrate type.

In another embodiment of the invention, four separate connections to four corners can be provided to the beamforming module as a surface-mount component, such as those in the beamforming integrated circuits. The power combiner/splitter lines connecting said four branches can also be fabricated on said component as a thin film circuit. Likewise, additional switches can be employed to these four terminals for providing a choice of polarization, or a branch line coupler, for instance, may be included with this switch. In another preferred alternative embodiment of the invention, the main circuit is formed on alumina in the beamforming module, and the varactor and switches can be configured on the sapphire as flip-chip surface mounts, together with said thin-film components. In this way, thickness limitations of thin layers, restrictions on the number of modules due to the number of varactors and switches obtained from a thin layer, and the need for stringent drilling requirements can be eliminated.

These and other aspects, structural and characteristic features, advantages, and embodiments of the present invention will become more apparent from, and will be understood more clearly by reference to the following detailed description, examples, and associated figures.

Figure 1A:
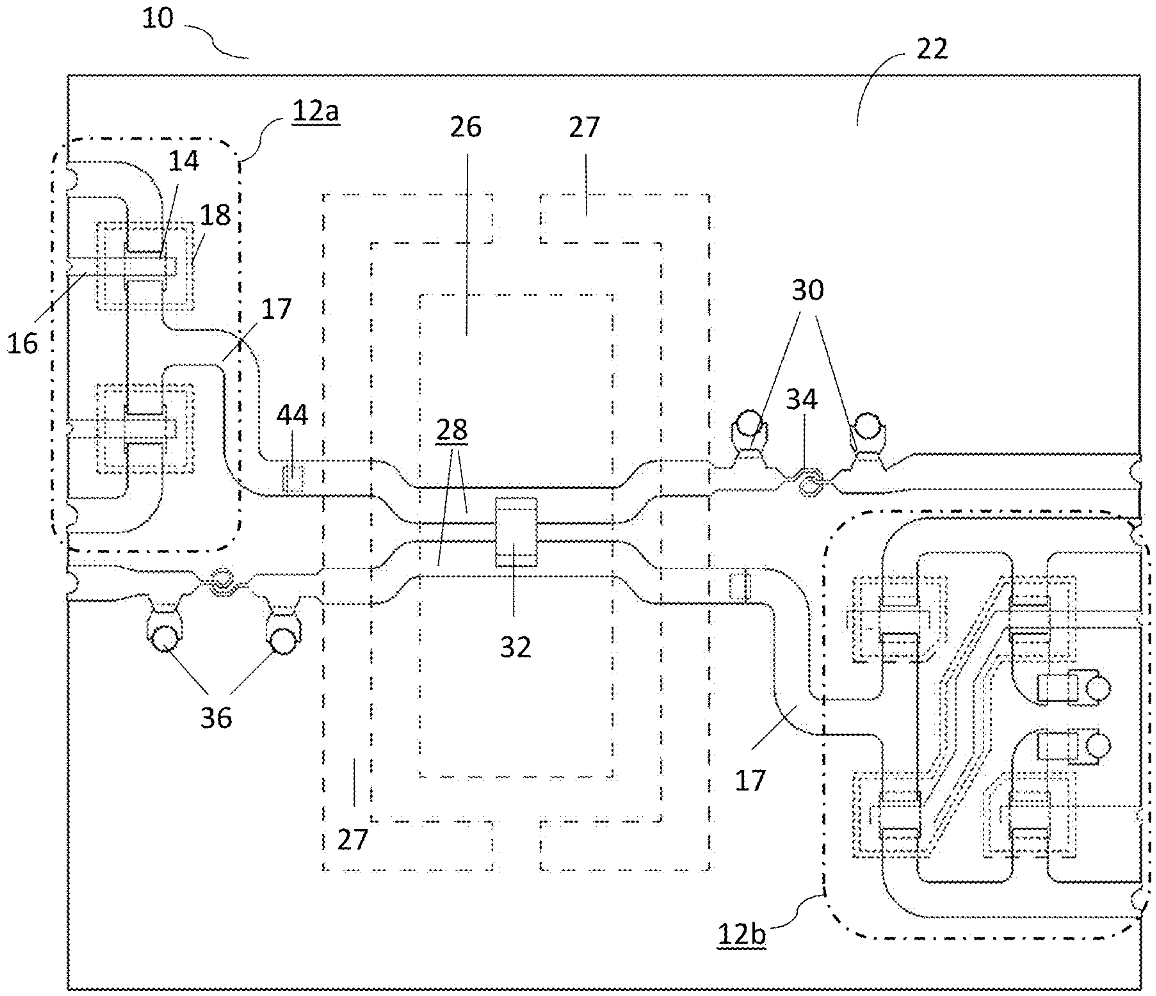
FIGS. 1*a-b* are illustrative top views of a single-channel and a four-channel compact beamforming module, respectively, according to the invention, showing the main components on a single substrate.

The said figures do not necessarily need to be scaled and insignificant details may be omitted therein to avoid obscuring aspects of the invention. Wherever possible, the same reference numerals will be used throughout the figures and the description to refer to the same or like parts, and, for simplicity, reference numbers may not be repeatedly indicated for those parts in all figures.

EXPLANATION OF REFERENCES IN FIGURES

10—Beamforming module
12—RF switches (RF switching circuits)
12_a_—Reflective RF switch component
12_b_—Absorptive RF switch component
14—Thin film layer/line ($VO_2$)
15—Insulation layer
16—Control (conductive connection) lines
17—Transmission lines
18—Insulating defected ground structure
19—RF signal connection points/lines
20—Phase shifter (Phase shift circuit)
22—Substrate
26—Primary defected ground structure
27—Secondary defected ground structure
28—Coupled (transmission) lines
30—Varactor (thin film)
32—Capacitor
34—Inductor
36—Screw holes
37—Connectors
38—Surface mount substrate
40—Power divider/collector
42—Printed resistor
44—Coupling capacitor

DETAILED DESCRIPTION OF PREFERRED EMBODIMENTS

A compact beamforming module (10) for phased array antennas according to the invention as illustrated in FIGS. 1_a_ and FIG. 1_b_, comprises RF switches (12) and at least one phase shifter (20) comprising coupled lines (28) connected to a varactor (30), and constructed on a thin film structure arranged on the defected ground structure (26, 27). Owing to said embodiment, a synergistic switching approach between passive circuits is maintained and higher Q values and higher power handling can be achieved at low costs.

The coupled lines (28) are conventionally formed by properly coupling two transmission lines (17), taking into consideration odd-mode and even-mode impedance and frequency values. The term varactor (30) refers to a semiconductor diode acting as a voltage-dependent capacitor and may also be referred to as a varicap diode, tuning diode, or voltage variable capacitor diode. The term defected ground structure (DGS) (26, 27, 18) means slots, voids, or defects of various geometries integrated on the ground plane/layer/line and is also referred to as defective or faulty ground structure, namely defects or voids arranged on the ground surface formed on either surface of the substrate (22) (i.e underside) according to the invention. On the other hand, it is obvious that the abbreviation RF is meant for radio frequency and microwave.

Figure 2A:
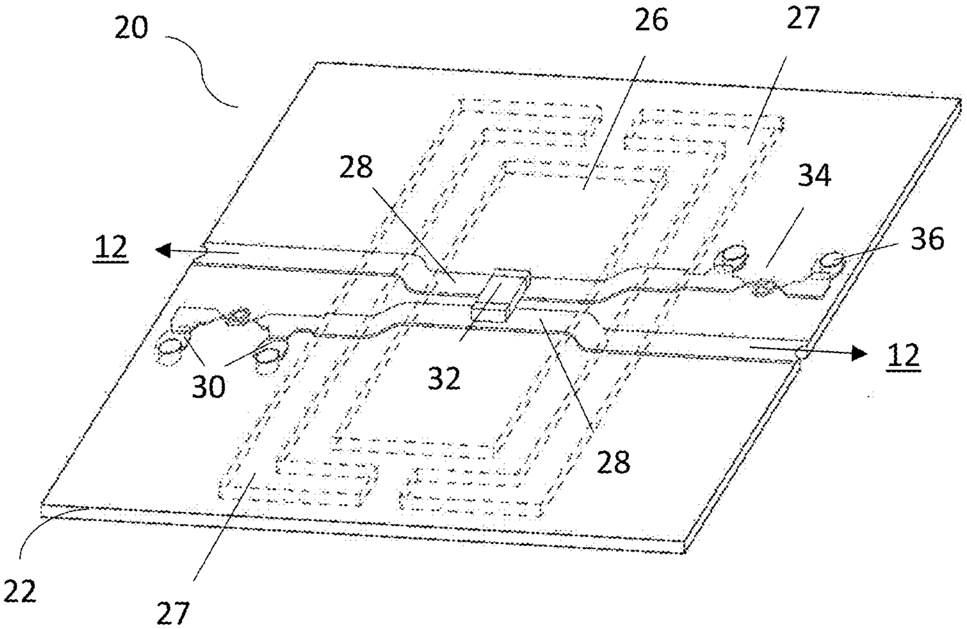
FIGS. 2*a-b* are illustrative perspective views of a preferred phase shift circuit from the top and bottom, the later view of which has the varactor component made of surface-mounted flip-chip technology as an alternative embodiment to the built-in varactor component of FIG. 2*a*.
Figure 2B:
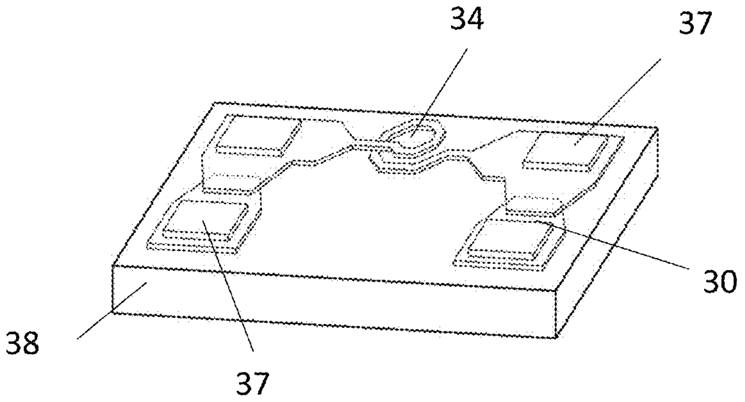

As illustrated more clearly in FIG. 2_a_, in a preferred embodiment of the invention, said phase shifter (20) essentially consists of coupled lines (28) with varactors (30) formed on the primary defected ground structure (26). Secondary defected ground structures (27) can also be formed in another embodiment, if required further. Such structure (27) may preferably be, for instance, in the form of square complementary split ring resonator (CSRS). For ease of illustration as a non-limiting example, the coupled two lines (28) is shown here in a reciprocal (inverse symmetrical) arrangement, each of which has equivalent components (30, 34) constructed on the single substrate (22), with defected ground structures (26, 27), the first of which (26) is formed like a longitudinal rectangle shape extending vertically whereas the second pair (27) arranged in U-like forms with their ends facing each other and mutually surrounding the first one.

The capacitance changes depending on the voltage applied to the varactor (30). This allows for the desired phase shift effect by changing the transmission phase of the coupled line circuit (28). Said varactor (30) preferably has a thin film component grown on the surface and this component is preferably selected from ferroelectric material, where Barium Strontium Titanate (BST) is preferred.

Owing to the use of BST thin film varactors (30) in the preferred embodiment of the invention, for example in the MIM structure (with metal-insulator-metal-based topology), the required variable capacitance can be provided on the same substrate (22) on which the coupled lines (28) are formed, wherein certain maximum/minimum capacitance ratio is 1.4 to 3.0, for instance. Likewise, further advantages such as low voltage operation and low nonlinearity are also obtained. Thus, the need for an additional discrete diode on a different process, such as a hyper-abrupt varactor epitaxially grown on GaAs, and extra pads and wire ties to connect with this diode, can be eliminated.

The odd-even mode impedances are adjusted appropriately by means of said defected ground structures (26, 27) and the coupled lines (28) constructed thereon. The defected ground structures (26, 27) increase the even-mode impedance. Optimization is achieved by adjusting the characteristic impedance and length of the transmission lines (17) connected to the coupled lines (28). Optionally, a capacitor (32) having an odd-mode impedance reducing effect can be added between the coupled lines (28). Likewise, an inductor (34) can be added between the two varactors, if needed. Thus, low odd-mode and high even-mode impedances can be achieved, and phase shifter (20) performances of high values can be obtained, for instance, together with the low parasitic capacitance of the selected BST varactor (30).

The width of the void provided on the ground layer that forms the defected ground structure (26), and the width and distance between the lines (28) are both calculated according to the dielectric constant and height of the substrate (22). The length of the coupled lines (28) is determined according to the operating frequency band, and the dielectric constant and height of the substrate material (22).

In a preferred embodiment, conductive screw holes (36) are drilled to ensure the connection of the said varactors (30) to the ground surface on the underside of the substrate (22). In an alternative embodiment of the invention as illustrated in FIG. 2_b_, instead of said screw holes, conductive connectors (37) on the varactor (30) component which are formed on the substrate (38) with surface-mounted flip-chip technology, are soldered to another board or substrate. A similar approach can also be applied for RF switching circuits (12) according to the invention.

Figure 3A:
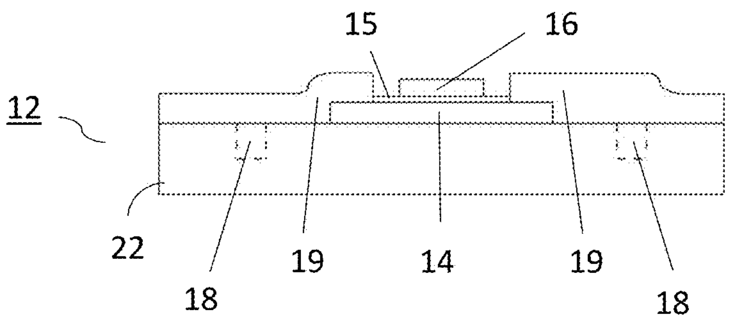
FIGS. 3_a-c_ are illustrative front-center vertical section views and top views of reflective and absorptive components, respectively, of a preferred RF switching circuit according to the invention.
Figure 3B:
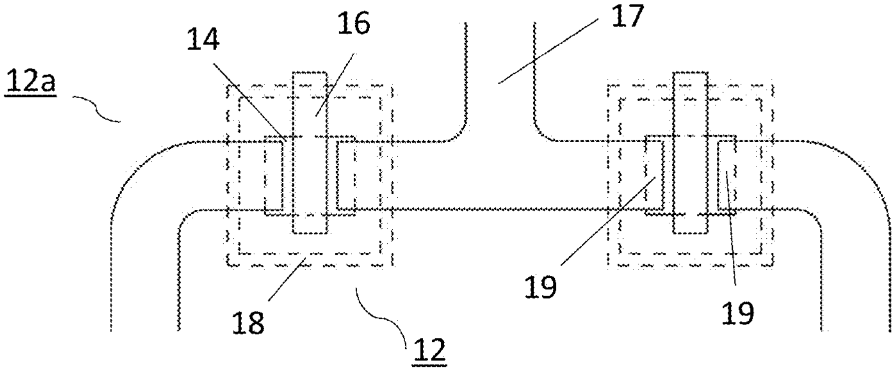
Figure 3C:
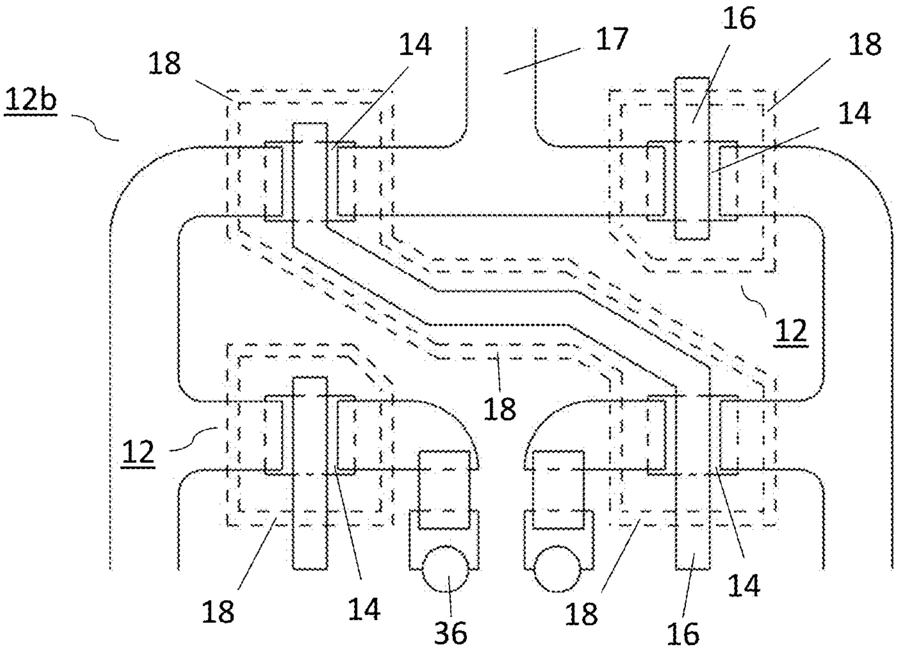

FIG. 3*a* illustrates a front vertical section view of an RF switch (12) as an exemplary embodiment according to the invention. FIG. 3*b* and FIG. 3*c* illustrate top views of an RF switching circuit (12) with a reflective component (12*a*) and an absorptive component (12*b*) in the form of a single-pole omnidirectional (SPDT) switch. Said RF switches (12) contain a thin film vanadium dioxide ($VO_2$) component grown on the surface.

The switching function is carried out by using the thermochromic property of the $VO_2$ thin film layer (14) (metal-to-insulator transition), transmitting the RF signal to the desired line (19) whereas the other lines are terminated by high impedance. Each switching circuit (12) is connected to at least two $VO_2$ thin film lines (14) connected to the common transmission line (17).

The $VO_2$ thin film has a high-resistance insulator characteristic under a certain transition temperature and a low-resistance conductor characteristic above said temperature. The temperature of the thin film is increased by passing a current through the conductive control lines (16) connected to the switching circuits, whereas the film is cooled down when no current flows therethrough, so that the characteristic of the thin film can be controlled. In order to isolate the heat of the thin film from the surrounding components and/or other films in said embodiment, there is provided at least one thin insulating layer (15), preferably containing $SiO_2$, between the insulating defected ground structure (18) formed on the substrate (22) on which the thin film (14) is arranged, and the thin film (14) and the control line (16).

In a preferred embodiment, the need for an additional switch circuit constructed with a discrete switch integrate or discrete diodes is eliminated, owing to the switching made of the $VO_2$ thin film grown on the same substrate.

Figure 1B:
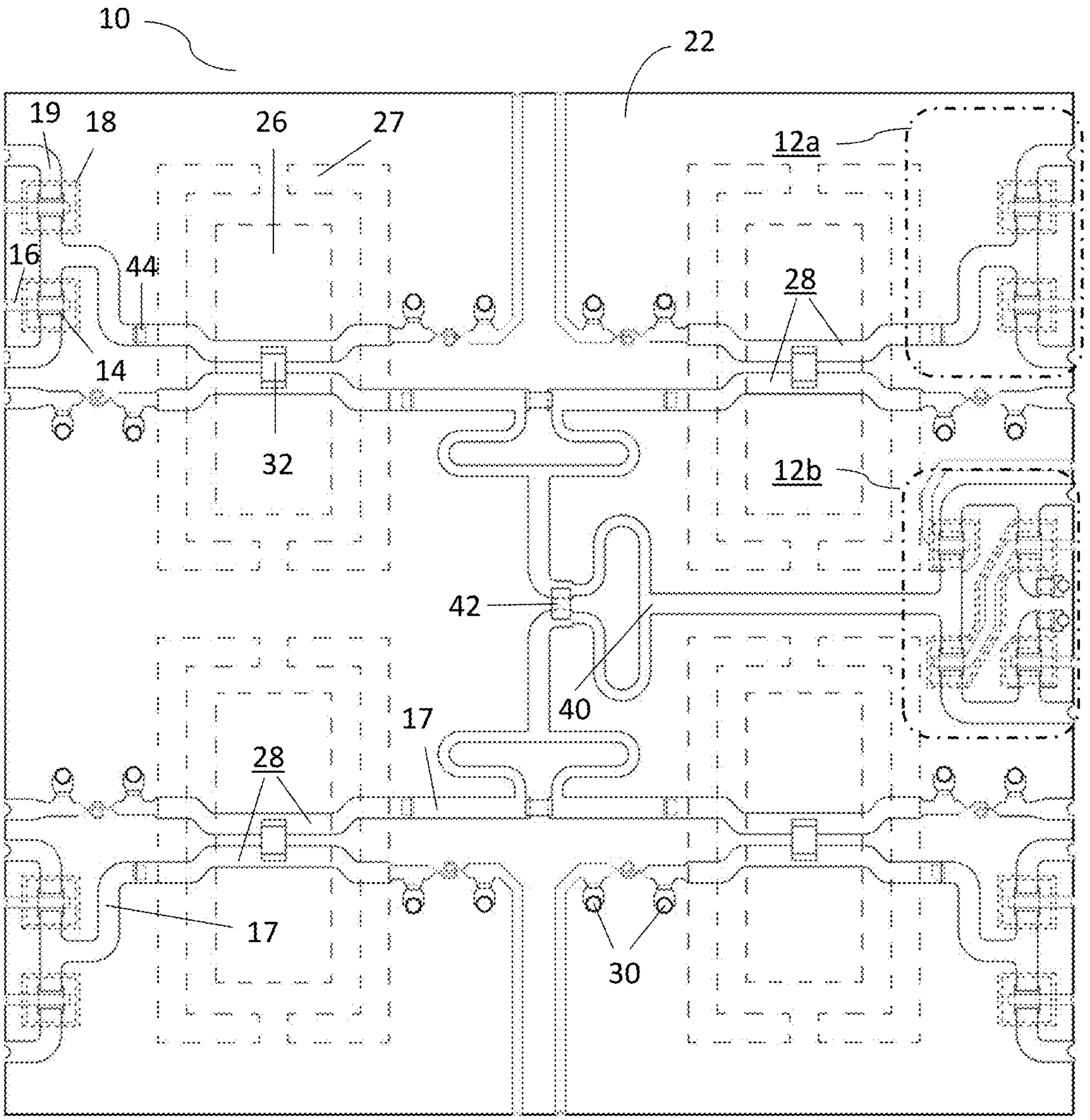

The beamforming module (10) of the invention further comprises a coupling capacitor (44), preferably a DC coupling MIM capacitor, which is connected to each pair of $VO_2$ thin film lines (14) via the transmission line (17). Compared to those of single-channel, multi-channel beamforming modules also include power dividers/collectors (40) and a printed resistor (42) for each resistive power divider/collector (40) (FIGS. 1*a*-1*b*).

For instance, four reflective antenna components, each of which being able to connect to two different polarization supply backbones, are fed in each beamforming module (10) placed in a phased array 8×8 antenna and configured on the printed circuit board. Depending on the placement and design of the antenna, all polarization options (vertical, horizontal, circular, etc.) can be supported.

Figure 4A:
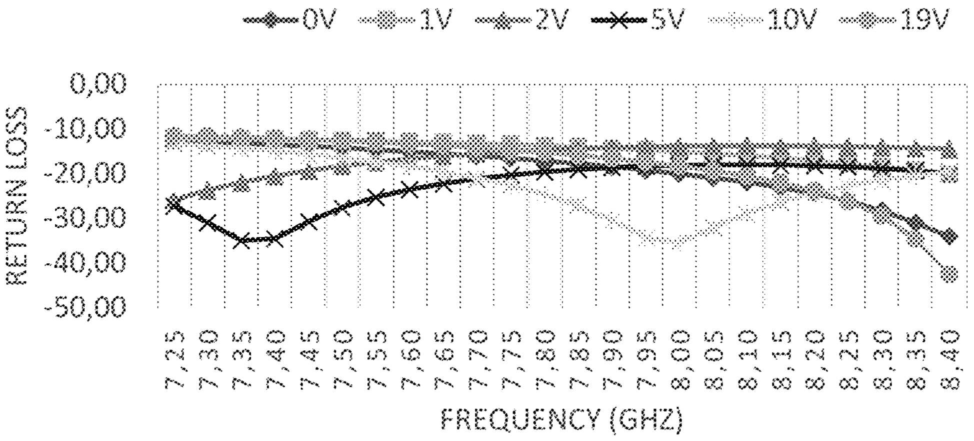
FIGS. 4_a_-4_c_ are graphs indicating return loss, insertion loss, and phase shift performance of an exemplary phase shift circuit, according to the invention, with respect to frequency and voltage changes, respectively.
Figure 4B:
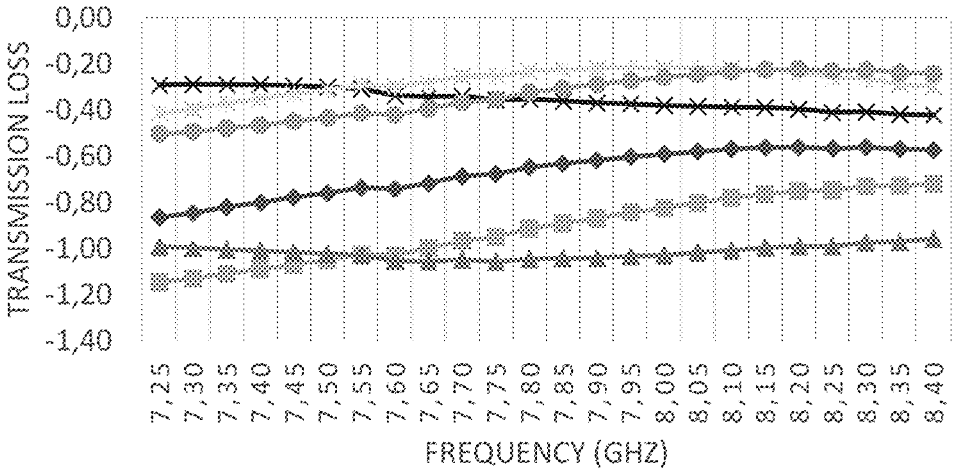
Figure 4C:
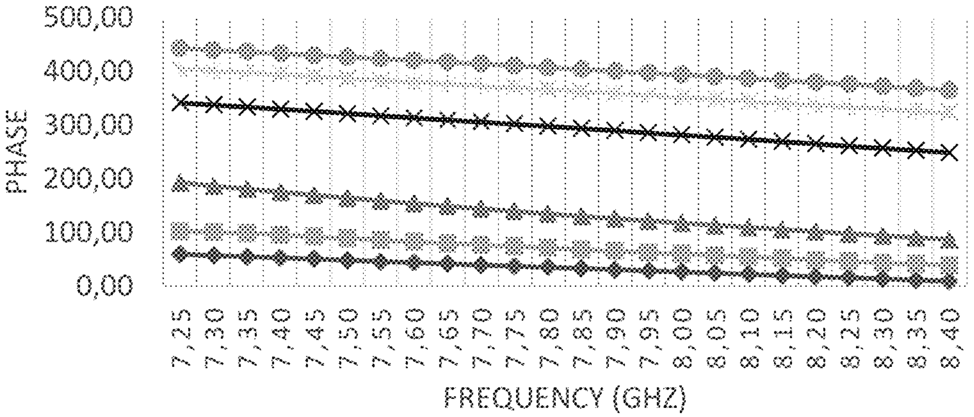

As an exemplary application, hyper-abrupt GaAs varactor diodes (two for each 0402 package) of Macom company were connected to one end of each coupled lines on the printed circuit board, and a voltage was applied therethrough in the range of 0-19 V. The return loss, insertion loss, and phase shift performance obtained according to frequency and voltage changes, are shown respectively in the graphs of FIG. 4*a*-4*c*.

The phase shifter configuration of the invention is demonstrated by the higher performance outcome than the digital phase shifter integrated circuits in which the fixed phase shift values are selected by switching. The performance measure here is obviously the ratio of the phase shift in degrees to the transmission loss in dB. The reason for this achievement is that there remains no need for use of serial switches employed conventionally in said circuits, and consequently, the transmission loss associated therewith is eliminated.

In the said example, the S parameters of the phase shifter are reported in the range of 7.25-8.40 GHz so as to cover the entire frequency band of X-band SATCOM transmitter (7.90-8.40 GHZ) and receiver (7.25-7.75 GHZ). For all frequency ranges, the return loss is below-10 dB, the 360-degree full phase range can be obtained with transmission loss values of less than 3 dB, or even about 2 dB, so the resultant FoM (figure of merit) value of approximately "360°/2 dB" is found to be unique. The said outcome demonstrates a much superior performance compared to the loss values of more than 6 DB in close prior art applications, such as CMOS, SOI, GaN, etc.

The phase shifter is based on variable capacitance, unlike phase shifters that use the variable properties of ferroelectric materials. Depending on the used substrate, the coupled lines have a high-quality factor and the applied voltage provides a phase shift by changing the capacitance of the varactors only connected to this line. In this respect, high performance is obtained. In addition, the process variation is not high since the effect of the crystal structure obtained depending on the growth process parameters of the thin film varactor on the performance is restricted.

The key performance measure is the frequency at which the impedances of $R_{on}$ and $C_{off}$ are equal to each other, and said frequency is calculated according to the formula:

$$f = 1/\{2 * pi * R_{on} * C_{off}\}$$

In the embodiment of the invention, the switch transmission loss is lower than those of the semiconductor switches. The switching speed is higher than MEMS switches. This is important for communication systems using time division multiplexing (TDMA) and time division duplexing (TDD) waveforms. Similarly, the antenna's transmission/receiving mode transitions are required to be fast in radar and electronic warfare systems.

For the conservation of energy in phase shifters, that is, the quality (Q) factor representing the ratio of the energy preserved in the system to the lost energy, is one of the important indicators. In this respect, a higher Q value is a desired feature for low-loss transmission lines and filters. Said thin-film circuits are constructed on substrates of very low dielectric loss constant via high-precision laser processing. In this way, advantages such as low-frequency error of the bands passed/printed through the filters and sensitivity for suppression values are achieved.

Combining the two basic control elements provided by the module and method according to the invention, in a small physical area on the same substrate, being completely independent of the substrate, easy integration with semiconductor circuits, and usability with high power amplifiers to provide high EIRP antennas are unique synergistic features. By providing the components altogether with high synergy and performance, a compact and advantageous structure is obtained.

While certain examples and embodiments of the present invention have been described so far, it is obvious that various changes, modifications, and adaptations can be made by those skilled in the art without departing from the spirit and scope of the invention. For example, thanks to the inventive beamforming module, there are no restrictive and binding conditions for antenna design preferences. For instance, by using the said module, antenna design can be made on any substrate, via fabrication of any layered structure.

Since the thin-film design can be used as an insulated unit that provides input/output as a module, there is no limitation for a choice of method or material that would require growing the said film thereon. Accordingly, the embodiment of the invention can also fulfill the function of an integrated circuit that can be used in a target circuit by being mounted to the surface thereof. In terms of general characteristics compared to conventional applications in phased array antennas, the beamforming module of the invention has less loss-higher energy efficiency, and higher power handling-higher power output. Similarly, higher efficiency in the transmission state and lower noise in the receiving state can be achieved.

Therefore, with the attached claims, it is ensured that such changes and modifications are included in the scope of protection without departing from the scope and integrity of the invention.

What is claimed is:

1. A compact beamforming module (10) for phased array antennas, comprising at least one phase shifter (20) and RF switches (12), arranged on at least one layer on at least one substrate (22) wherein said phase shifter (20) comprises coupled lines (28) formed by coupled two transmission lines and constructed on a defected ground structure (26), there is provided at least one varactor (30) connected to each diagonally opposite end of said coupled lines (28), said varactor (30) and said RF switch (12) are essentially of a thin film structure, and said RF switch (12) comprising a thin film layer of vanadium dioxide (14).

2. The beamforming module according to claim 1, characterized in that said phase shifter (20) further comprises secondary defected ground structures (27).

3. The beamforming module according to claim 1, characterized by comprising a capacitor (32) between said coupled lines (28) for reducing the odd-mode impedance.

4. The beamforming module according to claim 1, characterized by comprising two varactors (30) at one end of said coupled lines (28) and an inductor (34) between said varactors (30).

5. The beamforming module according to claim 1, characterized by having a thin film structure on the said substrate (22).

6. The beamforming module according to claim 1, characterized in that said RF switching circuit (12) comprises a reflective component circuit (12*a*) and an absorptive component circuit (12*b*).

7. The beamforming module according to claim 1, characterized in that a thin insulation layer (15) is provided between conductive control line (16) of each RF switching (12) circuit, the insulating defected ground structure (18) formed on the substrate (22) on which the thin film (14) is arranged, and the thin film (14) and the control line (16).

8. The beamforming module according to claim 1, characterized in that said varactor (30) comprises a ferroelectric material grown on a sapphire or alumina ceramic surface.

9. The beamforming module according to claim 8, characterized in that said varactor (30) comprises barium strontium titanate or zinc oxide as a ferroelectric material.

10. The beamforming module according to claim 1, characterized in that said RF switch (12) comprises a layer of vanadium dioxide (14) grown on a sapphire, silicon or alumina ceramic surface.

11. The beamforming module according to claim 1, characterized in that each RF switching circuit (12) is connected to at least two vanadium dioxide thin film lines (14) connected to the common transmission line (17).

12. The beamforming module according to claim 1, characterized in that said substrate (22) is selected from the group consisting of aluminum, sapphire, GaAs, GaN, CMOS, and SiC, as a material of a high dielectric constant.

13. The beamforming module according to claim 1, characterized by comprising a coupling capacitor (44) connected to each pair of $VO_2$ thin film lines (14) via the transmission line (17).

14. The beamforming module according to claim 1, characterized by comprising power divider/collectors (40) and a printed resistor (42) for each resistive power divider/collector (40).

15. A method of manufacturing a compact beamforming module (10) for phased array antennas, comprising at least one phase shifter (20) and RF switches (12) arranged on at least one layer on at least one substrate (22) wherein conductive elements are provided to define signal and transmission paths/lines on said substrate (22) and said elements are positioned on signal paths/lines, comprising the following steps;

arranging each phase shifter (20) and the RF switches (12) consisting of a thin film layer of vanadium dioxide (14) on at least one defected ground structure (26/27/18), wherein said phase shifter (20) comprises coupled lines (28) formed from two coupled transmission lines; and causing a phase shift of a signal by connecting at least one varactor (30) made of a ferroelectric material to each diagonally opposite end of the coupled lines of said phase shifter.

16. The method according to claim 15, characterized in that the thin film layer of vanadium dioxide (14) of said RF switch (12) is grown on a sapphire, silicon or alumina ceramic surface.

17. The method according to claim 15, characterized in that said ferroelectric varactor (30) comprising barium strontium titanate, or zinc oxide, is grown on a sapphire or alumina ceramic surface.

18. The method according to claim 15, characterized by reducing the odd-mode impedance via a capacitor (32) provided between said coupled lines (28).

19. The method according to claim 18, characterized by further reducing the odd-mode impedance and increasing high-mode impedance via two varactors (30) provided at one end of said coupled lines (28) and an inductor (34) between these varactors (30).

20. The method according to claim 15, characterized in that a thin film process is used on said substrate (22) in said compact beamforming module (10).

* * * * *